United States Patent [19]

Parkison et al.

[11] 4,364,523

[45] Dec. 21, 1982

[54] FLOW CONTROL TECHNIQUE

[75] Inventors: Richard G. Parkison; Edward G. Hofstetter, Jr., both of Louisville, Ky.

[73] Assignee: American Standard Inc., New York, N.Y.

[21] Appl. No.: 130,886

[22] Filed: Mar. 17, 1980

[51] Int. Cl.³ .................................................. B05B 1/30
[52] U.S. Cl. ................................. 239/533.14; 138/43; 138/46; 239/570; 239/590.5
[58] Field of Search ........... 239/533.1, 533.13, 533.14, 239/562, 570, 571, 590.5, 600; 138/42, 43, 46; 137/498, 517

[56] References Cited

U.S. PATENT DOCUMENTS

| | | | |
|---|---|---|---|
| 2,762,397 | 9/1956 | Miller | 138/43 |
| 3,630,455 | 12/1971 | Parkison | 239/533.14 |
| 3,697,002 | 10/1972 | Parkison | 239/533.14 |

Primary Examiner—Jeffrey V. Nase
Assistant Examiner—Michael J. Forman
Attorney, Agent, or Firm—Robert G. Crooks; John P. Sinnott; James J. Salerno, Jr.

[57] ABSTRACT

This disclosure relates to a flow control device in which the discharge from the nozzle is kept at essentially the same volume rate of flow in spite of fluctuations in the hydraulic pressure upstream from the device by providing a spray body that has a group of radially disposed channels which are perpendicular to the general direction of flow. A flexible spray control washer spaced upstream from these channels responds to hydraulic pressure by pressing into the channels and restricting the flow area of each of these channels in proportion to the applied hydraulic pressure. In this way, the flow area within the chamber is inversely related to the hydraulic pressure in order to maintain a continuous volume rate of flow through the device.

3 Claims, 3 Drawing Figures

FLOW CONTROL TECHNIQUE

This invention relates to apparatus for controlling the volume rate of flow of a fluid from an orifice and, more particularly, to a flexible washer and spray body for insertion in the nozzle of a water faucet to control the volume rate of water flow from the nozzle, and the like.

There is a need for a simple and inexpensive apparatus that can be placed in the nozzle of a water faucet to control the volume rate of water flow from the nozzle. A volume control of this nature is required for household and industrial plumbing installations under a number of building codes. Aside from this legal requirement, water conservation considerations also impose a need for a flow control device of this character. Typically, it is desirable to provide a constant volume rate of flow in terms, say, of gallons per minute from a given faucet in spite of hydraulic line pressure fluctuations upstream from the flow control device. In this way, a reasonable volume of water is provided without regard to the degree to which the valves associated with the faucet are opened or the water pressure within the mains supplying the building distribution system varies.

A number of efforts to provide a suitable device have been advanced in the art, of which the descriptions in the following U.S. Patents are typical:

U.S. Pat. No. 3,630,455, granted Dec. 28, 1971 to R. G. Parkinson for "Spout End Apparatus" shows a water faucet fluid control device in which a flexible disc responds to hydraulic pressure by partially obstructing the flow areas of a number of perforations that are formed in a rigid disc. These perforations, moreover, all are in general alignment with the direction of fluid flow.

U.S. Pat. No. 3,697,002, granted Oct. 10, 1972 to R. G. Parkinson for "Flow Control Device" shows a flow control device that has a perforated flexible disc which bears against an array of protrusions that are formed on the adjacent surface of a solid disc. The perforations are in general alignment with the direction of fluid flow through the nozzle and hydraulic pressure forces the perforations against the protrusions to gradually obstruct the flow paths that the perforations provide.

Although both of these foregoing devices alleviate the problems that have characterized the prior art to a great extent there is, nevertheless, a continued need for an improved flow control device in which the volume rate of flow remains relatively constant through a broad range of hydraulic pressures. This basic need, moreover, must be satisfied, in a manner that suppresses the emission of irritating high frequency noise from the nozzle.

These and other problems that have characterized the prior art are overcome to a great extent through the practice of the invention. It has been found, for example, that a flow control device within a conventional water faucet nozzle will provide a generally linear output volume flow rate in spite of major fluctuations in the upstream hydraulic pressure if the flexible disc has a central aperture. In accordance with the invention, the flexible disc bears against a hard spray body in proportion to the applied upstream hydraulic pressure. The hard spray body has a number of channels in the surface that is adjacent to the flexible disc. These channels compel the fluid to flow in a radial direction that is generally perpendicular to the direction of the main stream of the flow through the faucet. The flexible disc presses into these channels, restricting the flow area through each of the channels in proportion to the applied hydraulic pressure. In this way a constant volume rate of flow is maintained through the channels and from the faucet nozzle, without generating an inordinate amount of noise.

For more complete appreciation of the invention, attention is invited to the following detailed description of preferred embodiment of the invention in conjunction with the accompanying drawing. The scope of the invention, however, is limited only through the claims.

Figure 1:
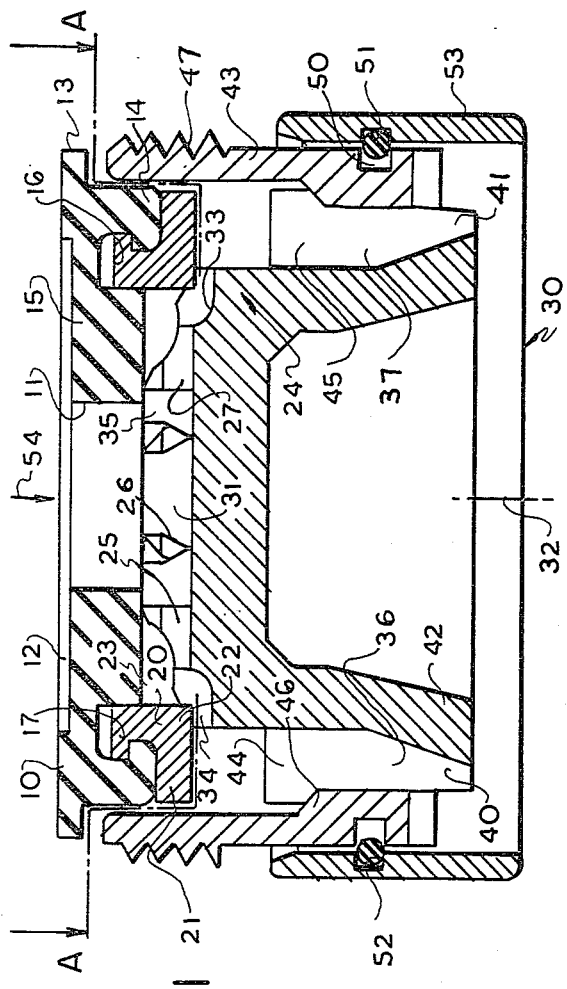
FIG. 1 is a front elevation in full section of a typical embodiment of the invention.

For a more thorough understanding of the invention, attention is invited to FIG. 1 which shows a spray control washer 10. The washer 10 is formed from flexible material of which 60A Durometer and 70A Durometer are typical. A centrally disposed aperture 11 is formed in the washer 10, concentric with the washer axis. The aperture 11 also is concentric with a larger diameter countersunk recess 12 that provides the surface area for the applied hydrostatic pressure. A peripheral flange 13 on the edge of the washer 10 forms a radially extended protrusion that provides a seal. This flange 13 extends in a radial direction beyond an axially oriented and inwardly disposed detent 14. As shown in the drawing, the detent 14 protrudes in a downstream axial direction for a distance that is somewhat greater than the thickness of a body portion 15 of the washer 10.

Between the detent 14 and body portion 15 of the washer 10 a reentrant recess 16 is formed in order to receive an axially disposed portion 17 of an annular washer retainer 20. The washer retainer 20 has a radially disposed flange 21 that bears against the end of the detent 14 on the spray control washer 10. The inner annular surface of the washer retainer 20 has a sharp circular edge 22 that rests in an annular notch 23 which is formed in the crown of a rigid spray body 24. The retainer 20 not only provides support for the flow control washer 10, but also tends to prevent the flow control device from being incorrectly assembled.

Figure 3:
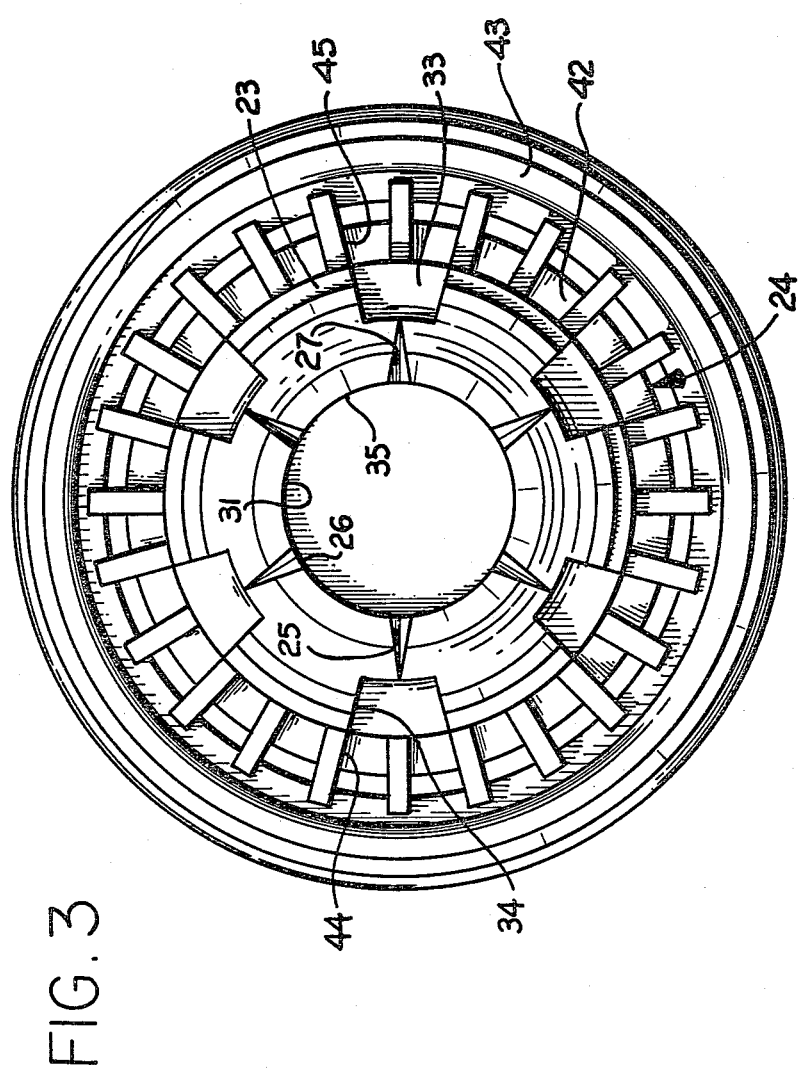
FIG. 3 is a plan view of the device shown in FIG. 1 with the spray control washer and washer retainer removed, i.e., a view along the section line A of FIG. 1 viewed in the direction of the arrows.

In accordance with a salient characteristic of the invention, the crown of the spray body 24 has a radially oriented array of channels of which the channels 25, 26 and 27 are illustrative. The open surfaces of the channels 25, 26 and 27 are on the upstream side of the spray body crown relative to a discharge 30 for the flow control device. Attention is invited to FIG. 3 for a clear perception of the radial orientation of channels 25, 26, and 27.

Returning to FIG. 1, attention is especially invited to the Vee-shape cross-section of the lower portion of the channels 25, 26 and 27. The upper portions of each of these channels, however, are provided with spaced, parallel sides. As best shown with respect to the channels 25 and 27, the radial profile of these channels is, in effect, a radially outward and downwardly sloping partition, the center portions of which are arcuate recesses. It has been found that this distinctive profile attains designed constant flow rates.

The channels 25, 26 and 27, moreover, are spaced in a downstream axial direction from the body portion 15 of the spray control washer 10. Partitions, of which the partition 31 is typical, divide the adjacent channels from each other. All of these channels, moreover, are oriented in a direction that is perpendicular to axis 32 of the spray control washer 10 and the spray body 24. In this way, the orientation of the channels is generally perpendicular to the general direction of upstream to downstream fluid flow through the flow control device.

To reorient the flow direction for the fluid passing through the channels 25, 26 and 27, an annular recess 33 is formed in the perimeter of the crown of the spray body 24. This recess 33, moreover, is interrupted at intervals by means of radially oriented supports 34 that provide the annular notch 23 which cradles the washer retainer 20. The spaced relationship between the washer retainer 20, the crown of the spray body 24 and the body portion 15 of the spray control washer 10 allows the body portion 15 to rest on the crown of the spray body 24 thus forming the channels.

Downstream from the channels 25, 26 and 27 radially disposed spacers 36 and 37 establish conduits 40 and 41 in which flow through the channels pass between a generally conical body 42 of the spray body 24 and an enclosing, axially disposed cylindrical spray housing 43. As illustrated, the spacers 36 and 37 have outwardly protruding members 44 and 45 that bear against an annular and inwardly disposed locating shoulder 46 that is formed in the downstream skirt of the spray housing 43. In this way, the entire combination of the spray body 24, the washer retainer 20 and the spray control washer 10 are supported within the spray housing 43.

The spray housing 43 extends parallel with the axis 32 for a distance that generally spans not only the major portion of the spray body 24 but also the interlocked portions of the detent 14, and the axially disposed portion 17 of the washer retainer 20 that is received within the reentrant recess 16. Adjacent to the interlocked members on the washer retainer 20 and the spray control washer 10, the radially outwardly disposed surface of the spray housing 43 is provided with threads 47 that enables the unit to be inserted and retained within the nozzle of a conventional faucet or the like (not shown in the drawing).

An annular recess 50 formed in the outer surface of the spray housing 43 receives a snap ring 51; the snap ring 51 presses into a corresponding interior recess 52 that is formed in the inner mid portion of a hollow cylindrical swivel skirt 53 to a depth that is less than the full diameter of the snap ring 51. This causes a portion of the snap ring 51 to extend into the annular recess 52. The annular recess 50, moreover, is of a depth such that the snap ring can be fully compressed during assembly of the swivel skirt 53 and then snap out into the annular recess 52 of the swivel skirt. In this way, the swivel skirt rotates freely relative to the spray housing 43 while nevertheless being securely fastened to the spray housing.

In operation, water, or other appropriate fluid, flows in the direction of arrow 54 through the centrally disposed aperture 11 in the washer 10. The hydraulic pressure of the fluid presses the body portion 15 of the washer 10 against the crown of the spray body 24 thus enabling the body portion 15 of the washer 10 to press into the open surfaces of the channels 25, 26 and 27, thereby restricting the flow area passageways through these channels. Thus, as the hydraulic pressure on the upstream side of the washer 10 increases, the flow area through the channels 25,26 and 27 undergoes a proportionate decrease. The net result of this balance between the flow area through the channels and the hydraulic pressure of the fluid serves to produce a constant volume rate of flow through the entire assembly over the operating range of interest. This volume rate of flow is established, moreover, in a way that reduces the noise output from the nozzle to acceptable levels.

Note in this respect that water flowing through this device must undergo a first change in flow direction of about 90 degrees in order to pass through the restricted channels 25, 26 and 27 in a direction that is perpendicular to the arrow 54. The diverted fluid then must undergo a second change in direction, again of about 90 degrees, in order to pass through the conduits 40, 41 and to discharge from the device.

Naturally, particles of matter entrained in the water system will tend to obstruct the channels. In order to cleanse this flow control device, it is necessary only to unthread the spray housing 43 from the nozzle and withdraw the washer 10 and its associated retainer 20 from their relative positions on the crown of the spray body 24 in order to expose the channels 25, 26 and 27 for cleaning.

Figure 2:
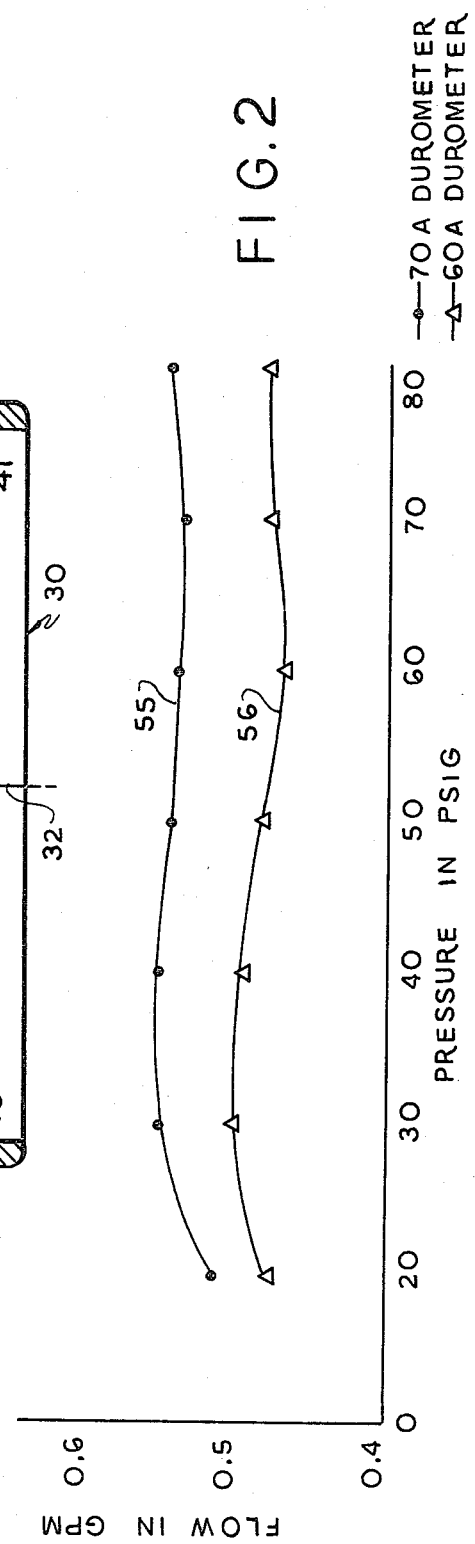
FIG. 2 is a graph of hydraulic pressure as a function of the volume rate of flow through the device that is shown in FIG. 1.

Attention now is invited to FIG. 2 which shows the generally linear response of the flow output in gallons per minute as a function of the hydraulic pressure upstream from the flow control device in the range between 20 to 80 lbs. per square inch (gauge). As illustrated, curve 55 shows test results achieved with a spray control washer 10 (FIG. 1) formed from 70A Durometer. Curve 56, which is somewhat less linear in its response over the pressure range of interest, is formed from 60A Durometer.

I claim:

1. A flow control device for a nozzle comprising, a generally annular flexible control washer for insertion within the nozzle, said washer having a centrally disposed aperture, a washer retainer secured to said control washer, a spray body for at least partial insertion within the nozzle spaced from said flexible washer by means of said washer retainer, said spray body having a plurality of radially oriented channels formed in the surface thereof that is adjacent to said spray control washer, said channels each having spaced, parallel sides terminating in respective Vee-shape cross-sections, the widest portion of said Vee-shaped channels being oriented toward said control washer, said spray body having at least one recess formed in the periphery thereof in fluid communication with said channels in order to establish at least one axially directed conduit, said flexible washer being spaced from said channels by said washer retainer a distance that enables said washer to respond to said flow by pressing against and restricting the transverse area of said channels.

2. A flow control device according to claim 1 wherein said radially oriented channels further comprise radial profiles, in planes generally perpendicular to said respective Vee-shape cross-sections, that slope with diminishing height toward the periphery of said spray body.

3. A flow control device according to claim 2 wherein said radial profiles further have arcuate recesses formed in the center portions thereof.

* * * * *